Dec. 28, 1965  J. N. MILLER  3,225,557
THREE-WAY VALVE AND SYSTEM THEREFOR
Filed June 21, 1963  3 Sheets-Sheet 1
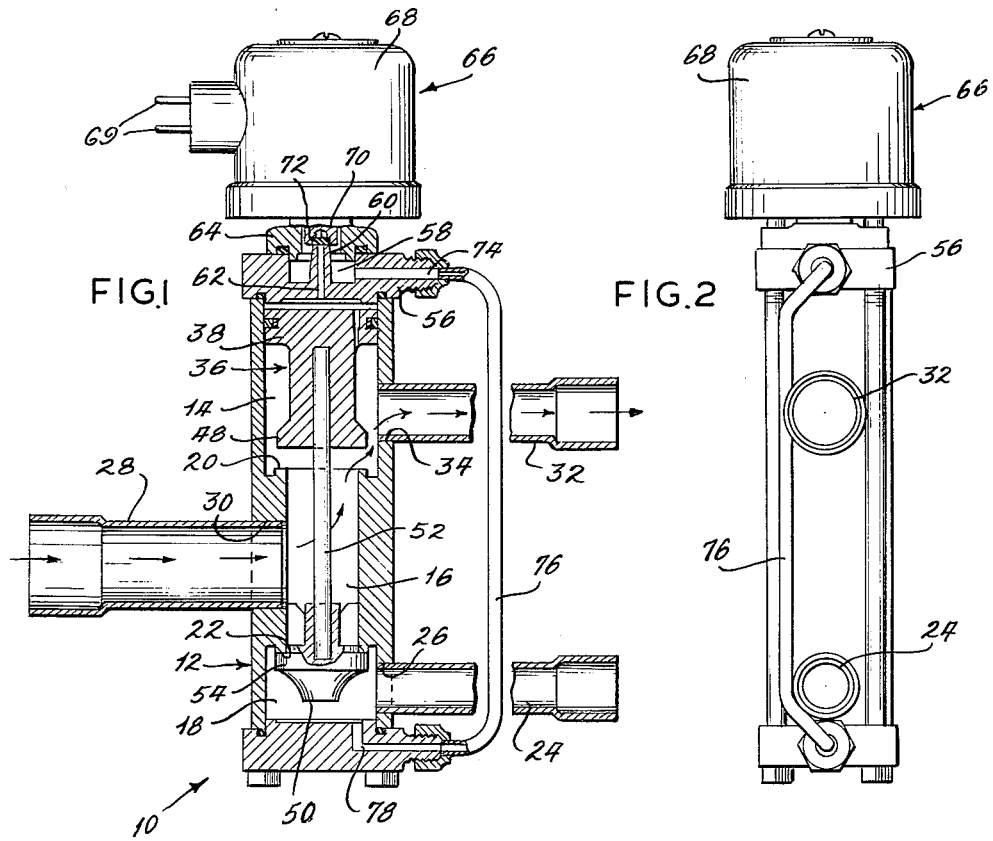
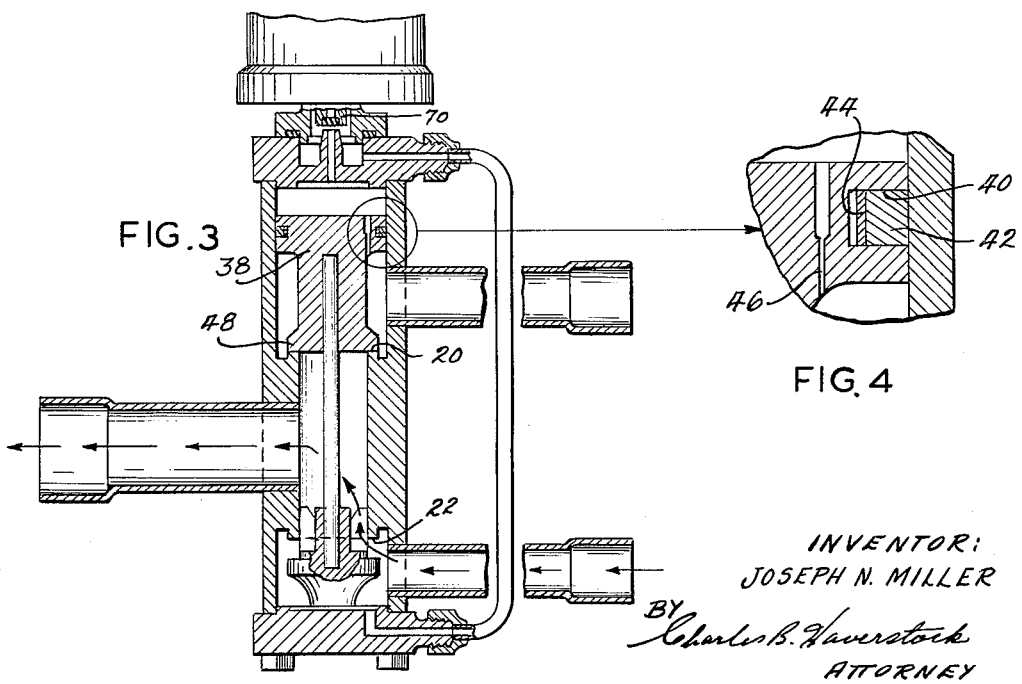
INVENTOR:
JOSEPH N. MILLER
BY Charles B. Haverstock
ATTORNEY

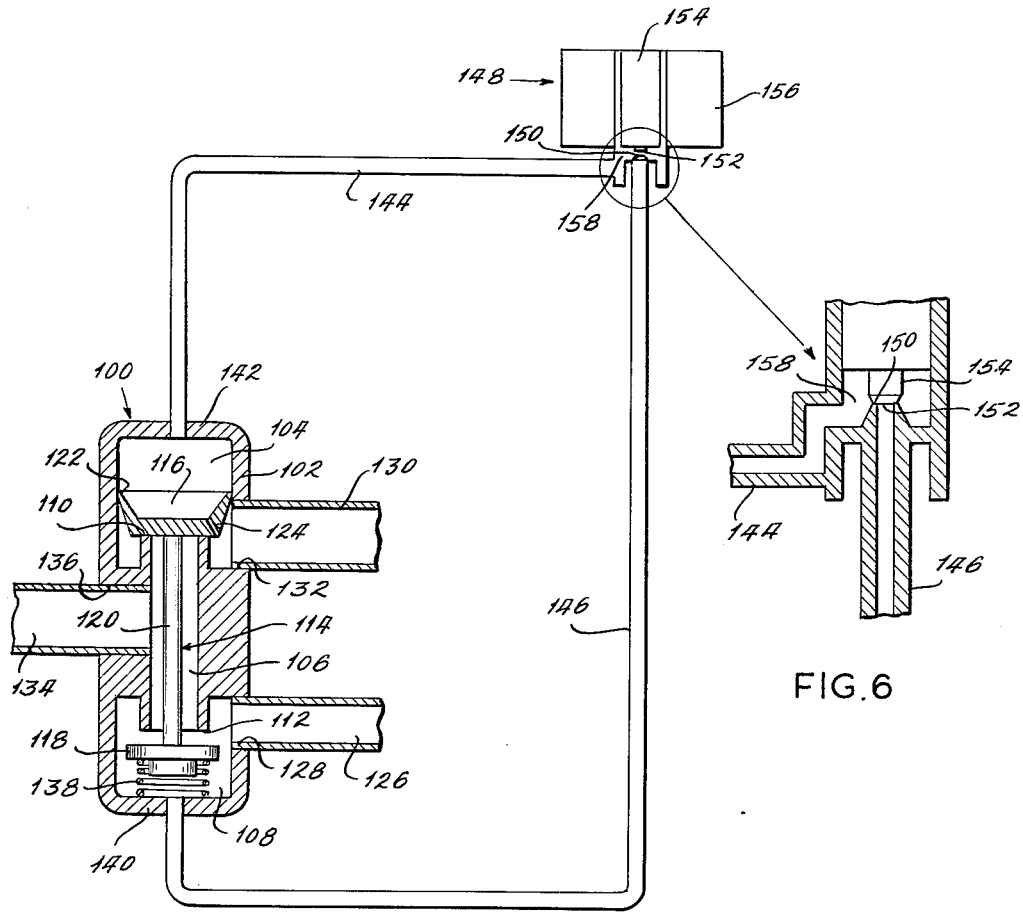

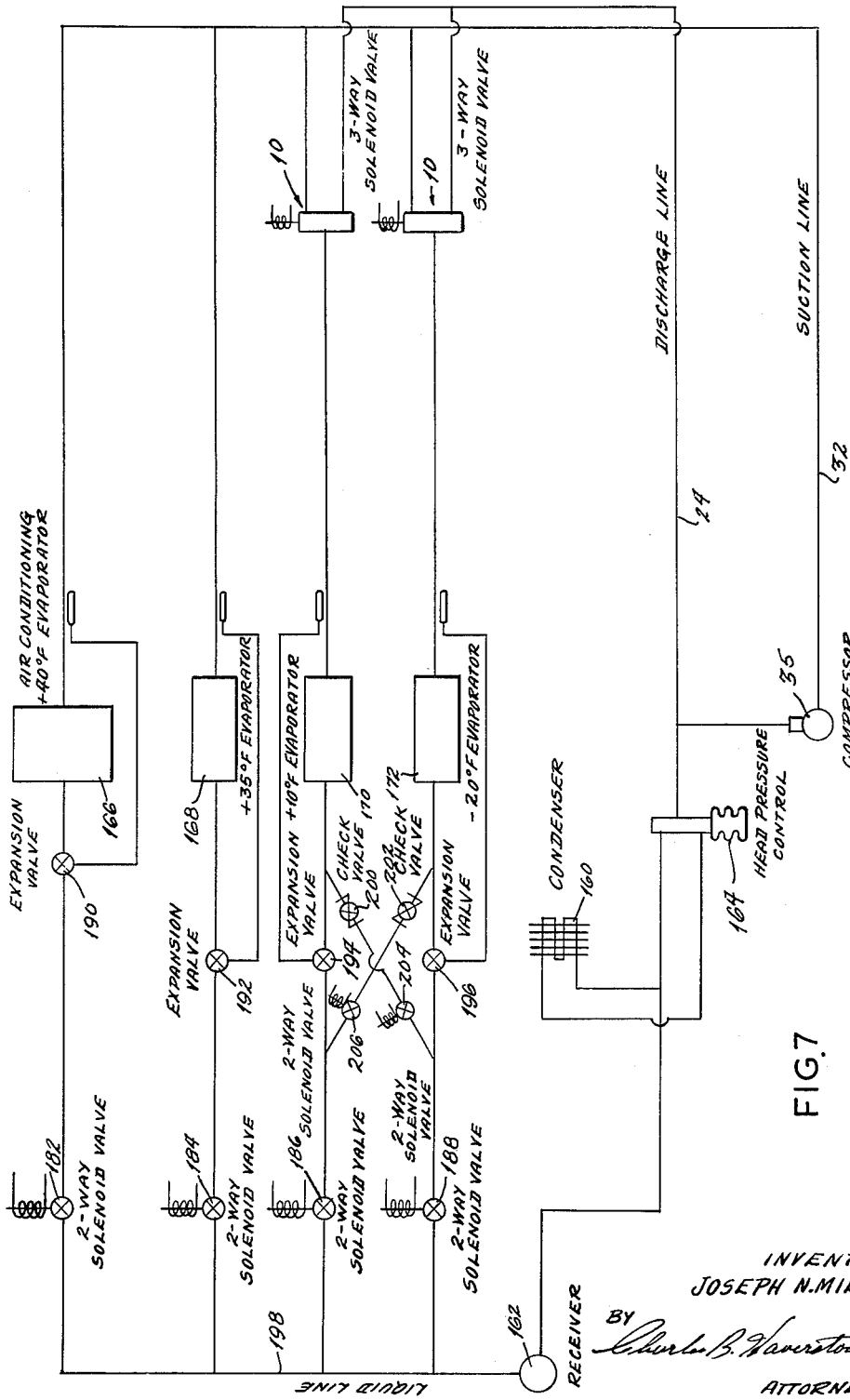

United States Patent Office

3,225,557
Patented Dec. 28, 1965

3,225,557
THREE-WAY VALVE AND SYSTEM THEREFOR
Joseph N. Miller, Overland, Mo., assignor to Jackes-Evans Manufacturing Company, St. Louis, Mo., a corporation of Missouri
Filed June 21, 1963, Ser. No. 289,577
16 Claims. (Cl. 62—156)

The subject invention relates generally to valves and systems therefor and more particularly to a three-way valve for use in refrigeration and air conditioning systems and the like.

Many different kinds of valves for refrigeration and air conditioning systems have been devised and used heretofore, and some of the valves employed have been three-way valves. So far as known, however, no one heretofore has devised a three-way valve for use in systems that include refrigeration, air conditioning and other similar devices operated off a central compressor and which enables certain units in the system to periodically go through defrost cycles without affecting the operation of other units in the system.

The present invention comprises a three-way valve for controlling the cycling of individual units in a system and a system in which said valves are used. The valve includes a body portion having a cylindrical chamber therein and three spaced ports into the chamber including a port for connection to the output of a compressor, a port for connection to the suction side of a compressor, and a port for connection to an evaporator device. The valve also includes piston means movable in the chamber for controlling communication between the aforesaid ports, and means for controlling the movement of the piston means in the chamber including solenoid means, pilot control means, and pressure relief means. The present invention also covers a novel system in which the subject valves are used.

A principal object of the present invention is to provide a three-way pilot operated valve for refrigeration systems and the like.

Another object is to provide valve means which better enables refrigeration, air conditioning and other similar equipment to be operated off of the same compressor.

Another object is to reduce the cost of systems having air conditioning, refrigeration and other similar equipment.

Another object is to reduce the cost of operating air conditioning and refrigeration equipment.

Another object is to provide relatively inexpensive means for controlling the defrosting of refrigeration equipment and the like.

Another object is to provide improved means for combining refrigeration and cooling means in the same system.

Another object is to shorten the time required to defrost refrigeration equipment and the like.

Another object is to provide means for defrosting part of a system independently of other parts thereof.

Another object is to reduce down time and maintenance costs and cooling and defrosting equipment.

Another object is to provide a three-way valve which will operate over a relatively wide range of pressure differentials.

Another object is to simplify the construction, installation and operation of refrigeration, air conditioning and other similar equipment.

These and other objects and advantages of the present invention will become apparent after considering the following detailed specification covering a preferred embodiment thereof in conjunction with the accompanying drawings, wherein:

FIG. 1 is a cross-sectional elevational view of a three-way valve constructed according to the present invention;

FIG. 2 is a side elevational view of the subject valve;

FIG. 3 is a cross-sectional view similar to FIG. 1 but showing the valve in energized condition;

FIG. 4 is an enlarged fragmentary view of the portion of the valve of FIG. 3 that is shown encircled;

FIG. 5 is a cross-sectional view of a modified form of the subject valve shown in energized condition;

FIG. 6 is an enlarged fragmentary view of the encircled portion of the modified valve of FIG. 5; and FIG. 7 is a schematic view of a system in which a plurality of the subject valves are installed.

Referring to the drawings by reference numbers, number 10 is a three-way valve constructed according to the present invention. The valve 10 has a body assembly 12 with a chamber therein which includes an upper chamber portion 14, a central chamber portion 16, and a lower chamber portion 18. The chamber portions 14, 16 and 18 are all connected, and a valve seat 20 is formed between the upper and central chamber portions 14 and 16, and another valve seat 22 is formed between the central and lower chamber portions 16 and 18.

A conduit 24 that is connected at one end to the output of a compressor 35 is connected at the opposite end to the body assembly 12 at a port 26 which communicates with the lower chamber portion 18. Another conduit 28 which is connected to an evaporator device is connected to a port 30 in the assembly 12 and communicates with the central chamber portion 16, and a third conduit 32 is connected to the assembly 12 at yet another port 34 and communicates with the upper chamber portion 14. The conduit 32 is connected at its opposite end to the suction side of the compressor 35.

A piston assembly 36 is slidably positioned inside the assembly 12 and extends into all of the chamber portions 14, 16 and 18. The piston assembly 36 has an upper portion 38 with an annular outside groove 40 therein that receives a piston ring 42 and a piston ring expander member 44 (FIG. 4). The piston ring 42 slides on the cylindrical wall of the upper chamber portion 14 above the suction port 34 and isolates the chamber portions on the opposite sides thereof.

The upper piston portion 38 also has an equalizer orifice 46 therethrough (FIG. 4) which by-passes the piston ring 42 and provides continuous but limited communication to the portions of chamber 14 on opposite sides of the piston ring 42. The piston portion 38 also has an annular flanged portion 48 which cooperates with the valve seat 20 when the piston assembly 36 is in the energized or down position as shown in FIG. 3. The flanged portion 48 may have a resilient seal attached thereto if desired.

In the energized position the piston assembly prevents communication between the upper and central chamber portions 14 and 16. However, when the piston assembly 36 is in deenergized position as shown in FIG. 1, the chamber portions 14 and 16 communicate through the valve seat 20 and establish communication between the evaporator conduit 28 and the suction side of the compressor which is connected to the conduit 32. The direction of flow in the deenergized position is shown by the arrows in FIG. 1.

The piston assembly 36 also includes a lower piston portion 50 which is connected to the upper portion 38 by a rod 52. The lower piston portion 50 is positioned in the lower valve chamber portion 18 and has a flanged upper portion 54 which cooperates with the valve seat 22 when the valve is deenergized as shown in FIG. 1. In this position communication is cutoff between the compressor discharge conduit 24 and the evaporator conduit 28. The flange 54 can also be provided with a resilient seal if desired.

The valve assembly 12 is closed at the top by an upper closure member 56 which is provided with an annular recess or chamber 58. The chamber 58 is formed around an upwardly projecting portion 60 which is centrally located and which is provided with a pilot port 62 therethrough. The annular chamber 58 is closed on top by another closure member 64 and a solenoid assembly 66 is mounted on the member 64. The solenoid assembly 66 includes a housing 68 for a solenoid coil and associated armature means. The solenoid coil is connected by suitable leads or connections 69 to a control circuit such as a time control circuit which includes means for periodically energizing the solenoid to produce a defrost cycle. A solenoid armature 70 is movably positioned in the solenoid coil and is provided with resilient seat portion 72 that cooperates with the upper end of the portion 60 to close the pilot port 62 when the valve is in the deenergized condition shown in FIG. 1.

The annular chamber 58 that surrounds the portion 60 is connected to a passage 74 in the closure member 56, and the passage 74 is in turn connected to a tube 76. The tube 76 extends on the outside of the valve housing 12 and is connected at its opposite end to another passage 78 in the housing 12 which communicates with the lower chamber portion 18 and with the compressor discharge conduit 24.

When the valve 10 is in deenergized position as shown in FIG. 1 the compressor discharge conduit 24 is prevented from communicating with the central chamber portion 16 by the engagement between the lower piston portion 50 and the valve seat 22. At the same time, the evaporator conduit 28 communicates with the compressor suction conduit 32 through the chamber portions 16 and 14 and through the valve 20 which is open. In this deenergized condition flow takes place from the evaporator through the evaporator conduit 28 and the valve chambers 16 and 14 to the suction side of the compressor and this is the condition which is required to produce refrigeration and/or air conditioning.

When it is desired to defrost the equipment under control of the valve 10, the solenoid coil is energized by the time control circuit (not shown) which may be of a well known type. This causes the armature 70 to move upwardly away from the portion 60 and opens the pilot port 62. The discharge side of the compressor is now connected by way of the passage 78, the tube 76, and the passage 74 to the upper end of the pilot port 62. This connects the discharge side of the compressor to the chamber 14 above the piston portion 38 and produces a greater pressure above than below the piston portion 38. The pressure differential thus produced across the upper piston portion 38 causes the piston assembly 36 to move downwardly to its energized position. The downward movement of the piston assembly 36 continues until the annular portion 48 of the upper piston portion 38 engages the valve seat 20 and prevents communication between the evaporator conduit 28 and the suction side of the compressor as described above.

At the same time, the lower piston portion 50 which is connected to the upper piston portion 38 by the rod 52 moves downwardly and out of engagement with the valve seat 22 thereby establishing communication between the compressor discharge conduit 24 and the evaporator conduit 28. This produces opposite flow through the evaporator from that described above and the opposite flow produces a defrost cycle. The defrost cycle remains in effect until the solenoid is again deenergized when the pilot port 62 is closed. The defrost cycle is usually a timed cycle depending on the type of equipment involved. Other equipment controlled by other similar valves in the same system will not be effected except by their own independent controls.

During the defrost cycle some leakage will occur through the equalizer orifice 46 between the upper side of the piston portion 38 and the suction conduit 32. This is a desirable condition because it partially relieves the pressure differential across the upper piston portion 38 and enables the piston to more easily be moved between its several operating positions.

It is also contemplated to further refine the subject valve by providing spring means to urge the valve piston assembly 36 to its different operating positions under certain pressure conditions, particularly under conditions of relatively high and relatively low pressure differentials. Such spring means are usually placed in the lower chamber 18 between the lower piston portion 50 and the bottom wall of the chamber 18. It has not generally been found necessary, however, to provide such a spring for the usual pressure conditions that exist.

FIG. 5 shows a modified form of the present valve in its energized condition for a defrost cycle. The modified valve 100 has a housing 102 with a chamber that has an upper portion 104, a middle portion 106 and a lower portion 108. A valve seat 110 is positioned between the upper and middle chamber portions 104 and 106 respectively, and another valve seat 112 is positioned between the middle and lower chamber portions 106 and 108 respectively.

A piston assembly 114 is slidably positioned in the chamber and has an upper portion 116, a lower portion 118 and a connecting rod 120 therebetween. The upper piston portion 116 is made of a substance such as relatively hard but flexible plastic material or the like and is formed into a cup shape with an annular upper peripheral edge 122 that slides on the surface of the upper chamber portion 104. The upper piston portion 116 also has a small bleed hole or equalizer orifice 124 therethrough.

The discharge side of a compressor is connected to the lower chamber portion 108 by a conduit 126 and a valve port 128. The suction side of the compressor is connected to the upper chamber portion 104 below the upper piston portion 116 by a conduit 130 and a valve port 132, and an evaporator device is connected to the central chamber portion 106 by another conduit 134 and another port 136. The modified valve 100 also has a spring 138 positioned between the lower piston portion 118 and the bottom wall 140 of the valve housing 102 to urge the piston 114 upwardly in the valve.

The modified valve 100 has a top wall 142 to which is connected a conduit 144 which communicates with the upper chamber portion 104 above the piston portion 116. Another conduit 146 is connected to the bottom wall 140 and communicates with the lower chamber portion 108. The opposite ends of the conduits 144 and 146 are connected to a solenoid control device 148 positioned at a remote location from the valve itself. The control device 148 (FIG. 6) has a valve member 150 with a port that communicates with the conduit 146. The valve member 150 is normally engaged and the port closed by a resilient member 152 carried on the lower end of a solenoid armature 154 which extends upwardly into a solenoid coil 156. The conduit 144 communicates with a space 158 that surrounds the upper end of the valve member 150 so that when the solenoid coil is deenergized and the member 152 engages the member 150 communication between the conduits 144 and 146 is prevented.

In the deenergized condition the piston 114 will be in its upward position causing the lower piston portion 118 to engage the valve seat 112 to prevent communication between the compressor outlet and the evaporator. At this time the evaporator communicates instead with the suction side of the compressor to produce cooling or refrigeration.

When the solenoid coil 156 is energized, however, the member 152 moves away from the member 150 and thereby establishes communication between the conduits 144 and 146. The compressor pressure is now fed to the upper chamber portion 104 above the piston portion 116 and causes the piston to move downwardly in opposition to the force of the spring 138. In so doing the upper valve seat 110 is closed by the upper piston portion 116 and the lower valve seat 112 is opened. The discharge side of the compressor is now fed to the evaporator to produce a defrost cycle.

During the defrost cycles the bleed hole or equalizer orifice 124 allows some leakage therethrough between the compressor outlet and the suction side of the compressor. This takes considerable pressure off of the piston member and the valve seat 110, and also makes operation of the valve smoother. This is important to the invention.

The force applied by the spring 138 is also an important feature especially when the valve is operating under conditions of pressure extremes. For many applications, however, no spring is required as noted in connection with the structure shown in FIGS. 1–4.

FIG. 7 shows a system in which refrigeration and air conditioning equipment are operated by the same compressor using the subject valves to control the defrost cycles of various of the refrigeration units. The important thing to note is that each refrigeration unit is operated and controlled independently of the other units in the system, and each refrigeration unit can have its own defrost cycle schedule as required. This means that a store, such as a grocery store or supermarket, can operate all of its refrigeration units at different temperatures and on different defrost cycles and the same compressor can be used for all. The same compressor can also be used to operate the air conditioning equipment and any other devices requiring a compressor. The grocery store operation is mentioned to illustrate one of many possible situations where the subject device could be used but is not intended to limit its use to any particular system.

The system shown in FIG. 7 includes a main compressor 35 which has a discharge line 24, and a suction line 32. The system also includes a condenser 160, a receiver 162, a head pressure control device 164, which controls and distributes the output of the compressor between the condenser 160 and the receiver 162. In addition, the system includes four separate evaporator circuits each of which is used in conjunction with a different piece of equipment such as a refrigerator or an air conditioner. Evaporator 166, for example, is employed in an air conditioner, evaporator 168 is employed in conjunction with a relatively high temperature refrigerator unit, evaporator 170 is employed in a lower temperature refrigerator unit, and evaporator 172 is in still a lower temperature refrigerator. The evaporators 166 and 168 are operated at above freezing temperatures and therefore do not accumulate frost and do not have to be defrosted. The evaporators 170 and 172, however, are operated at below freezing temperatures where frost does accumulate and therefore require periodic defrosting to keep them frost free. The evaporators 170 and 172 are therefore placed under control of three-way valves constructed according to the present invention, and are defrosted independently of each other on different defrost cycles without affecting the operation of the rest of the system.

Thermostatic control means are provided in conjunction with each of the aforementioned evaporators and provide on-off temperature control for the respective devices. The thermostatic temperature control means for the evaporators 166, 168, 170 and 172 include solenoid controlled valves 182, 184, 186 and 188 respectively. These valves are under control of thermostatic control devices that are not shown. When the valves 182, 184, 186 and 188 are closed the associated evaporator circuits are inoperative and when they are open refrigeration takes place.

Each evaporator circuit in the system also has an expansion valve which valves are numbered 190, 192, 194, and 196. Other similar evaporator circuits could also be included in the system depending on the capacity of the compressor and condenser.

The evaporators 170 and 172 which are operated below freezing are periodically defrosted by three-way valves under control of timing means as aforesaid, and each three-way valve has a connection to the compressor hot gas discharge line 24 and to the compressor suction line 32.

It should also be noted that the circuits of the two below freezing evaporators 170 and 172 which are controlled by three-way valves 10 are also interconnected by cross-over connection therebetween. The cross-over connections provide controlled return circuits for liquified refrigerant produced during a defrost cycle of one of the evaporators. Thus it can be seen that when one of the evaporators 170 or 172 is being defrosted by the hot gas output from the output of the compressor the liquified refrigerant produced therein is fed through one or more of the other evaporators and is used when said other evaporator is in its normal refrigeration cycle. The cross-over connections in the system shown in FIG. 7 comprise a check valve 200 (or 202), a solenoid valve 204 (or 206) and associated conduits connected as shown. It can now be seen that when the evaporator 170 is being defrosted the liquid refrigerant flows through the check valve 200 and the solenoid valve 204 and then back through the evaporator 172. This is possible because only one of the evaporators can be defrosted at one time and the one that is being defrosted will have its connections to the compressor reversed relative to the other evaporators thereby completing a return circuit for the liquidfied refrigerant. During the time that either of the evaporators 170 or 172 is being defrosted both of the associated two-way valves 186 and 188 are closed. It is also contemplated, as noted, to have the return path for the liquified refrigerant from the evaporators being defrosted distributed to the circuits of two or more of the other evaporators by providing more cross-overs or by providing other valve means. Circulating the liquid rerigerant through more of the evaporators has the advantage of speeding up the defrost operation and thereby reducing the time required for defrost.

The system of FIG. 7 is shown for illustrative purposes only and is not intended to limit the invention to a particular system. The system shown, however, does illustrate a typical multi-unit system having units operating at different operating temperatures and having all of the units operating off of a single compressor.

Thus there has been shown and described a novel three-way valve and a novel system which includes both refrigeration and air conditioning units or combinations thereof operating off a single compressor which fulfills all of the objects and advantages sought therefor. Many changes, alterations, modifications, and other uses of the subject valve and of the system disclosed, however, will become apparent to those skilled in the art after considering this specification and the accompanying drawings. All such changes, alterations, modifications, and other uses and systems which do not depart from the spirit and scope of the invention are deemed to be covered by the invention which is limited only by the claims which follow.

What is claimed is:

1. A refrigeration system comprising a compressor having a high pressure discharge line and a suction line, a condenser, a receiver, and a plurality of parallel connected circuits connected in series between the compressor discharge and suction lines, each of said parallel connected circuits including an evaporator device and a separate control valve for selectively refrigerating or defrosting said evaporator, each of said control valves having a connection to the compressor discharge line, a connection to the compressor suction line and a connection to the associated evaporator, and operator means for each of said control valves for selectively communicating the evaporator to the compressor suction line to produce flow therethrough in one direction for refrigeration and to the compressor discharge line to produce flow therethrough in the opposite direction for defrosting, each of said control valves includes a three-way valve having a first chamber portion therein connected to the compressor discharge line, a second chamber portion therein connected to the compressor suction line, and a third chamber portion connected to the evaporator, said operator means including a valve member movable in said chamber portions for selectively communicating said third chamber portion with said first and second chamber portions.

2. The refrigeration system defined in claim 1 wherein each of said parallel connected circuits includes a two-way control valve and means responsive to the temperature of the associated evaporator for controlling said two-way control valve.

3. The refrigeration system defined in claim 1 wherein other passage and valve means are provided for routing liquid refrigerant produced during defrosting of one of said evaporators through an evaporator in another of the parallel connected circuits.

4. A three-way valve for selectively controlling the direction of flow from a compressor through an evaporator, the compressor having a hot gas discharge outlet and a suction inlet, said valve comprising a housing having a chamber including a first chamber portion adapted to communicate with the evaporator, a second chamber portion adapted to communicate with the hot gas discharge outlet of the compressor, a third chamber portion adapted to communicate with the compressor suction inlet, valve means movable in the chamber between alternate operating positions for selectively communicating the first chamber portion with the second and the third chamber portions, and means for controlling movement of the movable valve means between said alternate operating positions including passage means connected between the second and third chamber portions and means for controlling communication through said passage means.

5. The three-way valve defined in claim 4 wherein said movable valve means includes a first valve seat positioned between the first and second chamber portions, a second valve seat positioned between the first and third chamber portions, said movable valve means including a first portion adapted to cooperate with and close the first valve seat in one operating position thereof and a second portion adapted to cooperate with and close the second valve seat in the alternate operating position thereof, said controlled passage means selectively establishing different predetermined pressure differentials across at least one of said portions of the movable valve means to move said means between the aforesaid alternate operating positions thereof.

6. The three-way valve defined in claim 5 wherein said passage control means includes solenoid pilot operated valve means.

7. The three-way valve defined in claim 5 wherein said first portion of the movable valve means has a pressure equalizer orifice therethrough which limits the pressure differential obtainable across at least said one portion thereof.

8. A three-way valve for refrigeration systems and the like including a compressor having a hot gas outlet and a suction inlet, and an evaporator comprising a valve housing having a chamber therein with a first chamber portion in communication with the compressor hot gas outlet, a second chamber portion in communication with the evaporator, and a third chamber portion in communication with the compressor suction inlet, a first valve seat positioned between the first chamber portion and the second chamber portion, a second valve seat positioned between the second chamber and the third chamber portion, piston means in the chamber including a first piston portion adapted to cooperate with and close the first valve seat in one position thereof, and a second piston portion connected to the first piston portion and adapted to cooperate with and close the second valve seat in a different operating position thereof, and means for causing the piston means to move between the aforesaid different operating positions thereof including means for establishing different predetermined pressure differentials thereacross, said last named means including a passage connected between the first and third chamber portions and solenoid controlled valve means for controlling communication through said passage.

9. The three-way valve defined in claim 8 wherein said solenoid operated valve means are positioned remotely from the valve housing.

10. The three-way valve defined in claim 8 wherein one of said piston portions has an orifice therethrough of more limited flow capacity than the said passage.

11. The three-way valve defined in claim 10 wherein said limited flow capacity orifice is in the second piston portion.

12. The three-way valve defined in claim 8 wherein said second and said third chamber portions communicate through the second valve seat to produce a refrigeration cycle when the solenoid controlled valve means are deenergized.

13. The three-way valve defined in claim 8 wherein said first and second chamber portions communicate through the first valve seat to produce a defrost cycle whenever the solenoid controlled valve means are energized, said energized solenoid controlled valve means establishing communication between the first and third chamber portions to produce a pressure differential across the piston means to cause the piston means to move to close the second valve seat and open the first valve seat thereby establishing communication between the compressor hot gas outlet and the evaporator.

14. A system having both refrigeration and air conditioning equipment therein comprising a plurality of parallel connected circuits each including an evaporator, an expansion valve and a control valve therein, a condenser and a compressor having a hot gas discharge line and a suction line connected across said parallel connected circuits, and a three-way control valve connected to the circuits of preselected ones of said evaporators which are operated below freezing temperature for controlling the refrigeration and defrost cycles thereof, each of said three-way valves having a chamber with a first chamber portion connected to the associated evaporator, a second chamber portion connected to the compressor hot gas discharge line, and a third chamber portion connected to the compressor suction line, movable valve means in said chamber portions, and means for selectively moving said movable valve means between alternate positions, one position providing flow communication between said first and third chamber portions to provide communication between the associated evaporator and the compressor suction line to produce flow in one direction therethrough for refrigeration, and a second position providing flow communication between the first and second chamber portions to communicate the evaporator with the compressor hot gas discharge line to produce flow through the associated evaporator in the opposite direction for defrosting, said movable valve means including piston members having separate connected piston portions positioned in the second and third chamber portions, and means including solenoid operated pilot valve means connected between the compressor hot gas discharge line and said third chamber portions in each of said three-way valves to selectively establish different preselected pressure differentials across portions of said piston members to cause said piston members to move between the said different operating positions thereof.

15. The system defined in claim 14 including separate timing means connected to each of said solenoid operated valve means for controlling the energizing and deenergizing thereof.

16. The system defined in claim 14 wherein said movable valve means has a restricted flow passage therethrough to limit the pressure differential that can be produced thereacross.

References Cited by the Examiner

UNITED STATES PATENTS

| | | | |
|---|---|---|---|
| 2,234,250 | 3/1941 | Harris | 62—152 |
| 2,237,261 | 4/1941 | McGrath | 62—152 |
| 2,351,140 | 6/1944 | McCloy | 62—81 |
| 2,525,560 | 10/1950 | Pabst | 62—155 X |
| 2,694,904 | 11/1954 | Lange et al. | 62—198 |
| 2,745,254 | 5/1956 | Malkoff | 62—198 |
| 2,920,653 | 1/1960 | Wolff | 137—624.43 |
| 2,969,091 | 1/1961 | Wolff | 137—624.43 |
| 2,983,286 | 5/1961 | Greenawalt et al. | 137—625.43 |
| 3,111,960 | 11/1963 | Marmo | 137—625.5 X |
| 3,151,470 | 10/1964 | Quick | 62—278 |

ROBERT A. O'LEARY, *Primary Examiner.*